United States Patent [19]

Hasegawa et al.

[11] 4,112,416
[45] Sep. 5, 1978

[54] CONTROL METHOD FOR A REMOTE SUPERVISORY CONTROL SYSTEM

[75] Inventors: Akiji Hasegawa; Isao Yasuda; Kazuhiko Kobayashi, all of Hitachi, Japan

[73] Assignee: Hitachi, Ltd., Japan

[21] Appl. No.: 674,761

[22] Filed: Apr. 8, 1976

[30] Foreign Application Priority Data

Apr. 9, 1975 [JP] Japan .................................. 50-42295

[51] Int. Cl.² .............................................. H04Q 5/00
[52] U.S. Cl. ................................ 340/147 R; 340/163; 340/152 R
[58] Field of Search ............ 340/163 R, 147 R, 152 R

[56] References Cited

U.S. PATENT DOCUMENTS

| | | | |
|---|---|---|---|
| 2,978,676 | 4/1961 | Spencer | 340/163 |
| 3,223,977 | 12/1965 | David | 340/163 |
| 3,435,416 | 3/1969 | Kretsch | 340/163 |
| 3,516,063 | 6/1970 | Arkin | 340/163 |
| 3,715,725 | 2/1973 | Kievit | 340/147 R |
| 3,975,712 | 8/1976 | Hepworth | 340/147 R |
| 3,979,723 | 9/1976 | Hughes | 340/147 R |

*Primary Examiner*—Harold I. Pitts
*Attorney, Agent, or Firm*—Craig & Antonelli

[57] ABSTRACT

This invention relates to a control method for a remote supervisory control system which includes a single master station and N (plural) remote stations sporadically lying in distant places, said method used for supervising and controlling the states of the N remote stations by the single master station. Since the method is of the type in which the one master station supervises and controls the states of the N remote stations, it is also termed the 1-to-N remote supervisory control method. The master station supervises the remote stations by indicating, for example, the "on" and "off" states of circuit breakers on the basis of signals from the remote stations, and controls the states of the remote stations by transmitting "off" and "on" control signals conversely from the master station to the remote stations.

4 Claims, 8 Drawing Figures

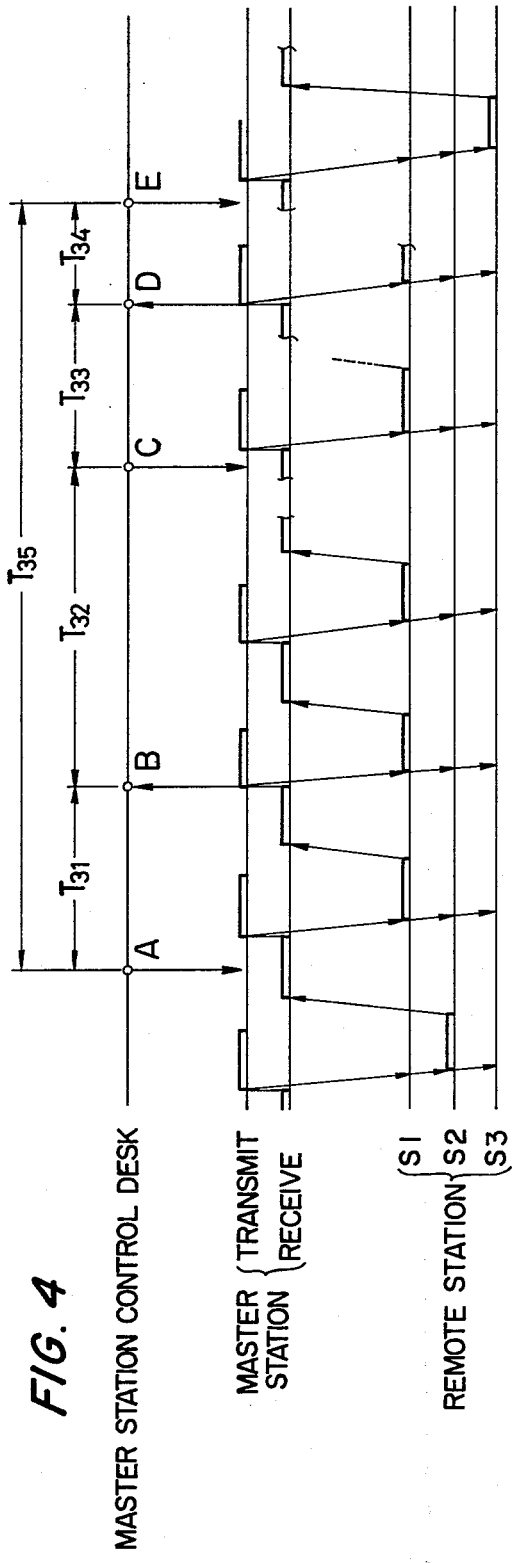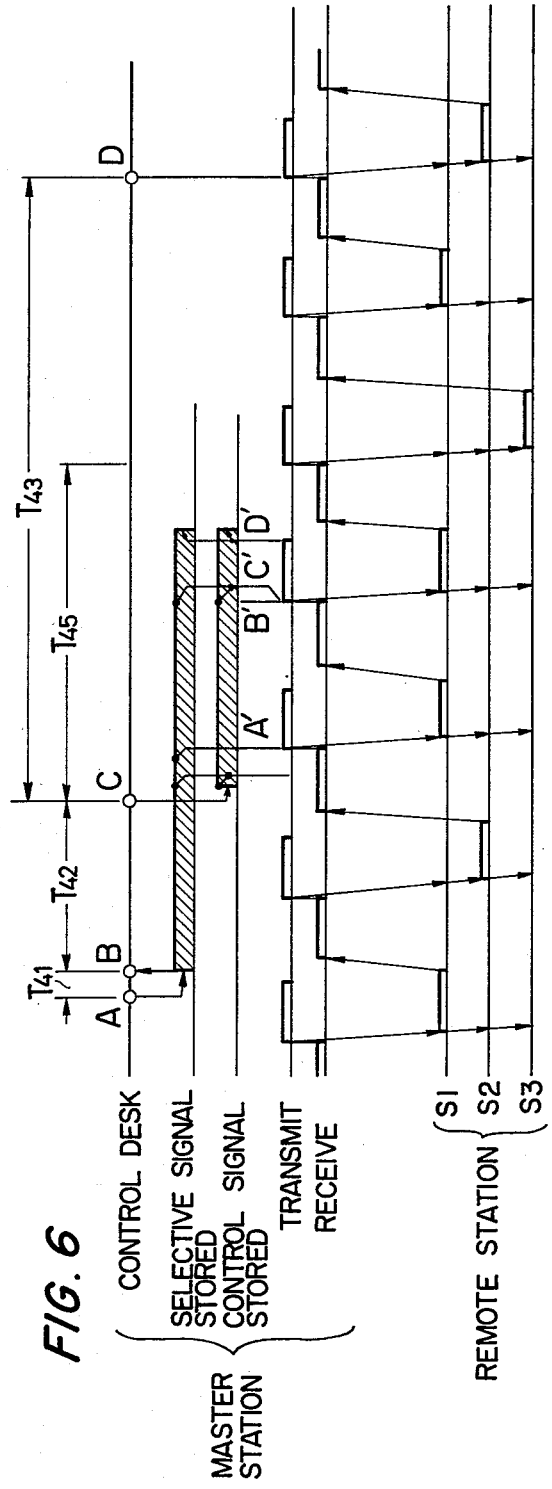

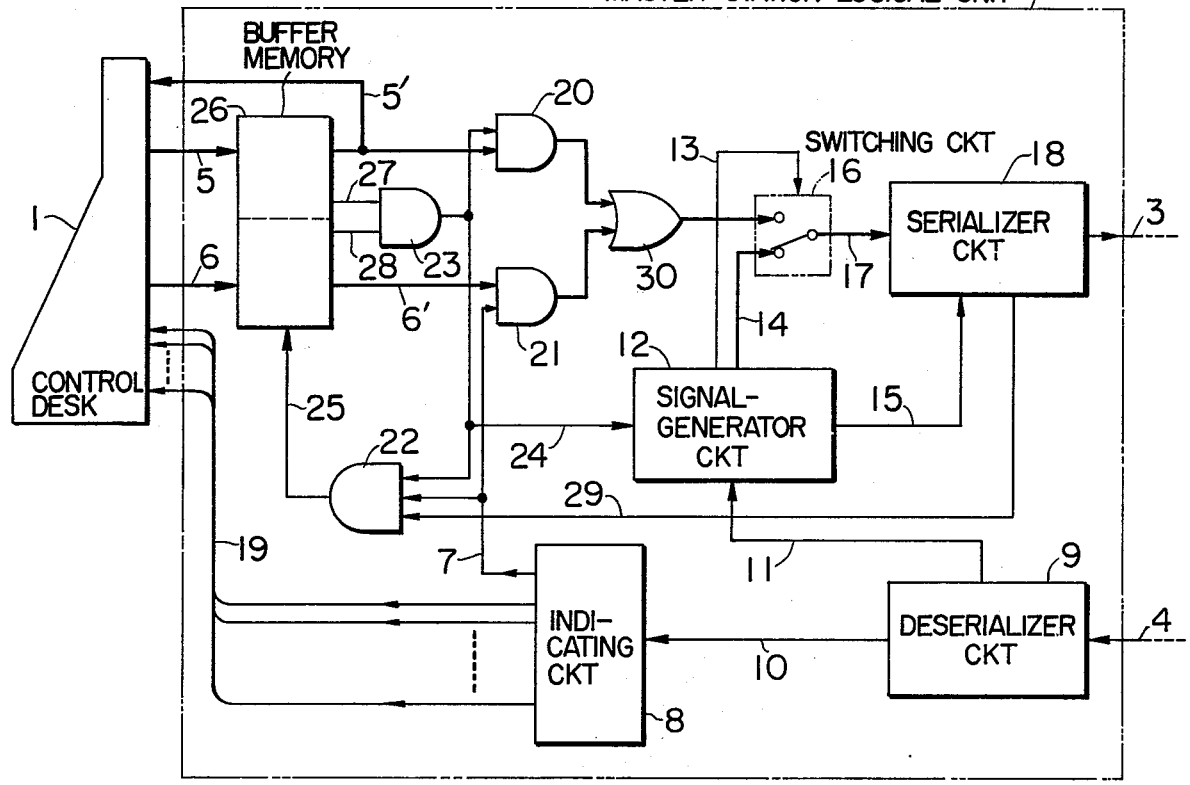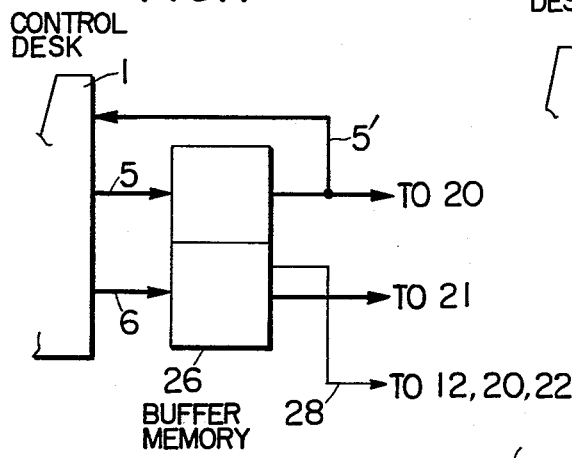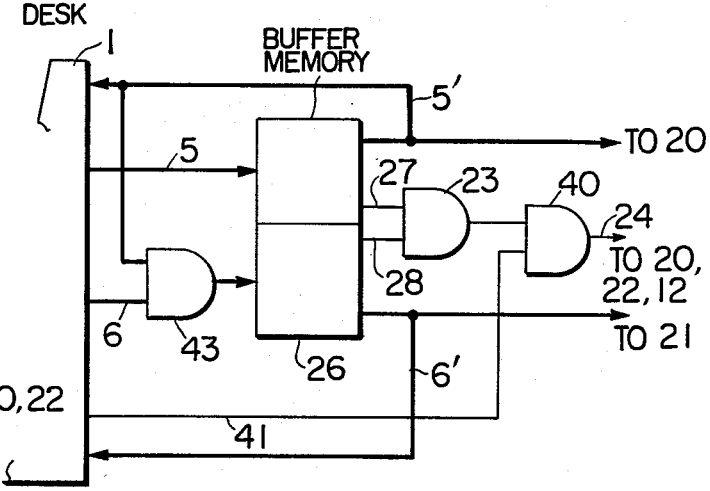

CONTROL METHOD FOR A REMOTE SUPERVISORY CONTROL SYSTEM

BACKGROUND OF THE INVENTION

1. Field of the invention

The 1-to-N type remote supervisory control method to be stated in the present application is often used in the case where, for example, the "off" and "on" states of circuit breakers in transformer substations sporadically lying in distance places are subject to the centralized supervisory control by a master station located at a central station. However, the centralized supervisory control of the substations is not restrictive or peculiar, but it is frequently desired to supervise and control the states of a large number of stations by a single central station.

In the so-called 1-to-N type centralized remote supervisory control system, it is a common practice to carry out the two-action control in which the master station equipment selects the remote station equipment to be supervised and controlled (in some cases, selects a unit to-be-supervised-and-controlled in the particular remote station equipment) and confirms it, whereupon it transmits a control signal to the selected remote station equipment. Especially in case of confirming the selected remote station and subsequently transmitting the operation control signal for the remote station, a confirmative judgement by a person (operator) who is at a control desk of the central master station equipment is needed, and a control lag is therefore involved. This invention relates to a control method for the remote supervisory control system as is improved in the operation of man-machine communication of the master station equipment in the two-action control.

DESCRIPTION OF THE PRIOR ART

The 1-to-N type remote supervisory control system has only one master station. In case of selectively controlling the N remote stations, therefore, simultaneous processing is impossible and the states of the remote stations are supervised and controlled sequentially in time series.

By way of example, the N remote stations are selected and scanned cyclically in sequence, and the states of the respective remote stations are indicated in the master station on the basis of signals received from the remote stations. Where only the indications of the states of the remote stations are being conducted in the master station equipment in this manner, no special problem is posed.

Description will now be made of a case where the master station equipment selects the remote station equipment and where the state of the selected remote station equipment is controlled. First, the master station equipment transmits a selective signal for the remote station being the object. Then, the remote station equipment sends a selection completion signal back to the master station equipment. A person who is at the master station equipment confirms the sending-back signal, whereupon the person issues a transmission command for an actuating signal and thus the control operation signal is transmitted to the remote station equipment having been selected. The remote station equipment having received the actuating signal has, for example, a circuit breaker turned "off" or "on" in conformity with the signal. This series of operations constitute the so-called twoaction control. That is, the remote station equipment is selected and the selection is confirmed, whereupon the actuating signal is transmitted and the state of the remote station equipment is controlled. Such priorart method has disadvantages to be described hereunder.

The first disadvantage is that, when the specified remote station is selected as the object in case of selecting and controlling the remote station equipment, the usual supervisory control which has been executing the sequential cyclic selection and the state indication of the remote station equipment till then is stopped. That is, the usual indicating supervisory control based on the cyclic scanning is stopped during the period during which the master station equipment selects the remote station equipment for the control operation, the remote station sends the selection completion signal back to the master station and the selection completion is confirmed by the person being at the master station equipment, and thereafter, the operation control signal is transmitted and the operation is controlled in accordance with the signal.

The second disadvantage is that, where the transmission speed is low in the two-action control from the master station equipment to the remote station equipment, the selection of the remote station equipment by the operator requires a long time until the selection completion signal is sent back. Such condition will cause the operator to unnecessarily feel anxiety because he cannot judge whether the transmission line is in trouble or the selection takes time although the transmission line has no failure. This is problematic especially in case where the number of the remote stations is large and where the transmission speed is low.

The third disadvantage is that, where the signal transmitting speed between the master station equipment and the remote station equipment is very high in contrast to the above case, the beneficial effect of the high-speed transmission line is spoiled because the human being takes charge of the confirmative judgement and the command of the actuating signal in the process of selecting and confirming the remote station equipment and commanding the actuating signal.

This invention intends to eliminate such disadvantages of the prior art and to provide an efficient two-action control method in the 1-to-N type remote supervisory control system.

BRIEF SUMMARY OF THE INVENTION

A first object of this invention resides in that, until a particular remote station equipment is selected and a control operation command signal for the remote station equipment is issued in the 1-to-N remote supervisory control system, the usual state indicating supervisory control of the other remote stations is continued.

A second object is associated with the first object, and resides in that, when the operation control signal for the particular remote station equipment is issued, the usual indicating supervisory control is automatically stopped, the selection and operation control of the particular remote station equipment being carried out without the intervention of an operator.

A third object resides in that, even when the number of remote stations is large and the transmission speed of signals between the master station and the remote stations equipments is low, an operator is prevented from unnecessarily becoming anxious in the communication between the operator and the master station equipment, i.e., the so-called man-machine communication.

A fourth object resides in that, only when an operator selects a particular remote station and subsequently commands an operation control signal in the master station equipment, the control of the particular remote station equipment is enabled.

This invention has a first feature in that, in order to accomplish the first object, a buffer memory is disposed in the master station equipment. After the selective signal and the operation control signal for the remote station equipment from the operator are stored in the buffer memory, then the selection and the control of the remote station equipment is shifted.

A second feature of this invention resides in that, in order to accomplish the second object, a logical product circuit is provided for the condition when the selective signal has been set in the buffer memory and the operation control signal has also been set, and a switch to change-over from the usual indicating operation mode to the selection and operation control mode is actuated by an output signal of the logical product circuit.

A third feature of this invention resides in that, in order to accomplish the third object, the confirmative operation of the selection and operation control command is performed between the buffer memory and the operator.

Further, a fourth feature of this invention resides in that, in order to accomplish the fourth object, the order of setting the selective signal and the operation control signal for the remote station equipment is predetermined, and an interlock circuit is provided which makes it impossible to set the signals in the reverse order.

BRIEF DESCRIPTION OF THE DRAWING

FIG. 4 is a flow chart showing a procedure in the case where the supervisory control of the states of equipments is made by the use of the logical circuit in FIG. 3, FIG. 5 is a block diagram of a logical circuit of a master station in this invention, FIG. 6 is a time chart showing a procedure for controlling remote station equipments in this invention, and FIGS. 7 and 8 are block diagrams each showing another embodiment of the master station logical circuit according to this invention.

DESCRIPTION OF THE PREFERRED EMBODIMENTS

Before the explanation of concrete embodiments of this invention, description will be made of the fundamental matters of the 1-to-N type remote supervisory control.

Figure 1:
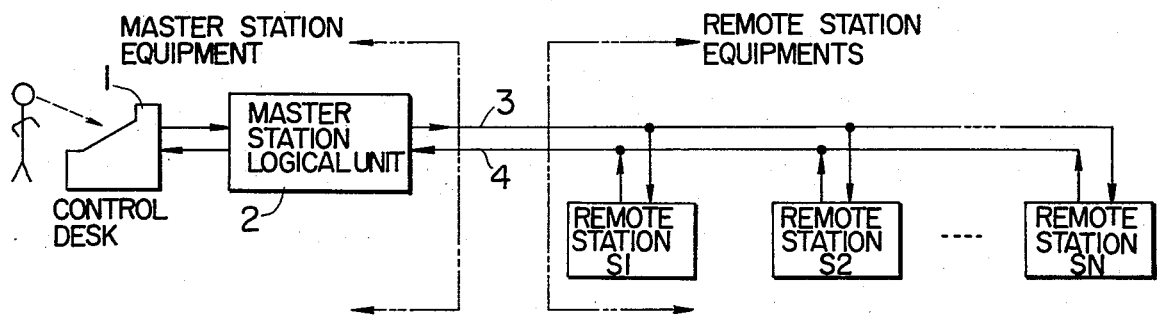
FIG. 1 is a block diagram of a schematic construction for elucidating a remote supervisory control system of the 1-to-N type.

The 1-to-N remote supervisory control system intends to supervise and control the states of a plurality of, or N, remote stations with a single master station. It is often applied to fields in which the states of the remote station lying scattered are requested to be subjected to the centralized supervisory control by the central master station. The fields are too numerous to mention, and include, for example, the relation between a central load dispatching office and substations or power stations in various places, the supervisory control of a plurality of dams in a water system, etc. A schematic block diagram of the fundamental construction is illustrated in FIG. 1.

The remote supervisory control system comprises one master station, N (plural) remote stations, and transmission lines. The master station equipment is composed of a master station logical unit 2, and a supervisory control desk 1 for performing the man-machine communication with an operator.

In many cases, the remote stations indicated at S1, S2, . . . . and SN are disposed sporadically in distant places. They are connected with the master station equipment through the control signal transmission line 3 and the indication signal transmission line 4, which are common thereto.

Only the remote station selected by a remote station calling information signal, which is transmitted from the master station through the control signal transmission line 3 to the particular remote station, is enabled so as to transmit an appliance state indicating information signal thereof to the master station, (through the indicating signal transmission line 4) as a response to the calling information signal. The state indicating information signal is indicated on the supervisory control desk 1. By successively transmitting the call signals of the remote stations in this way, the master station can remotely supervise the state signals of various appliances of the remote stations S1 - SN. Where it is desired to control a specified appliance in a specified remote station, a selective signal and a control command signal of the appliance are transmitted in lieu of the call signal. Thus, the remote supervisory control of the appliance can be executed.

Figure 2:
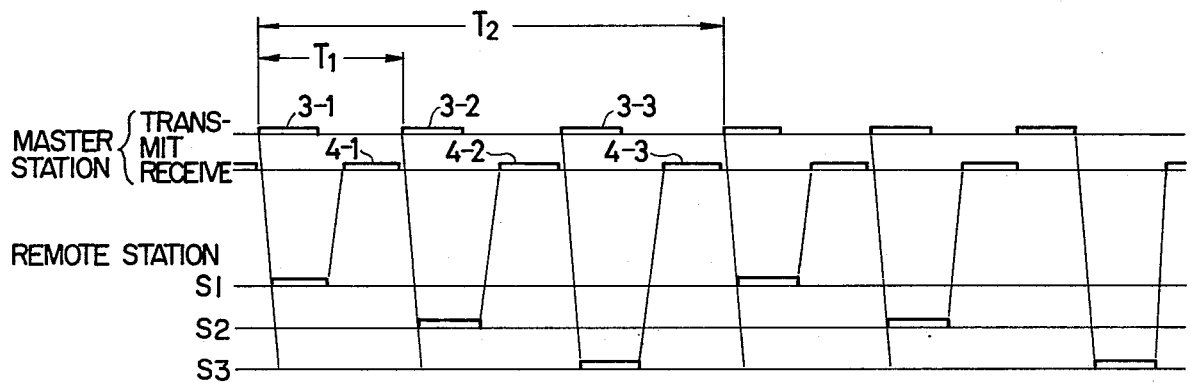
FIG. 2 is a time chart for elucidating usual scanning for calling remote stations.

FIG. 2 is a time chart showing a procedure in which the appliance state indicating information signal of the remote station is transmitted to the master station on the basis of the remote station calling information signal from the master station. Here, in order to facilitate the explanation, a case where the number of remote stations is three is illustrated.

A remote station S1 calling information signal 3-1 is transmitted from the master station to all the remote stations. Only the remote station selected by the signal responds, and the master station can receive an appliance state indicating information signal 4-1 of the remote station S1. Subsequently, the master station equipment transmits a remote station S2 calling information signal 3-2 from the transmission side thereof and receives an appliance state indicating information signal 4-2 from the selected remote station S2. Further, the master station equipment transmits a remote station S3 calling information signal 3-3 and receives an appliance state indicating information signal 4-3 of the remote station S3. In this way, the remote stations S1 - S3 are sequentially scanned to indicate and supervise the appliance states 4-1, 4-2 and 4-3 of the remote stations.

In FIG. 2, $T_1$ designates a period of time during which the remote station S1 is called and then the reception of the indicating information signal is completed (the call and response time of the remote station S1). $T_2$ designates a period of time which is required to call all the remote stations or the three stations S1 - S3 in this case and to receive their indicating information signals in the master station (the call and response time of all the remote stations). It is obvious that the call and response times of the remote stations S2 and S3 are also equal to the period of time $T_1$ in this case.

The period of time $T_1$ becomes longer in proportion to the quantity of indicating information signals per remote station, while the period of time $T_2$ is proportional to the total number N of the remote stations. Accordingly, in order to precisely grasp the appliance states of the respective remote stations in the master station at all times, the periods $T_1$ and $T_2$ need be made as short as possible. However, when the number N of remote stations is made very small, the merit of the present system wherein a large number of remote stations are subjected to the remote supervisory control by a single master station diminishes. In general, therefore, the number N of remote stations is so set as to satisfy the call and response time $T_2$ of all the remote stations allowable for the object system to which the control method is applied. The length of the period $T_1$ varies depending also on the transmission code construction and the transmission speed. Assuming by way of example that the remote station calling information signal consists of 88 bits (44 bits, of a synchronizing code + 44 bits of a calling code); the indicating information signal of one remote station consists of 220 bits, (44 bits of a synchronizing code + 44 × 4 bits of indicating codes); the transmission speed is 1,200 baud and the propagation delays of the transmission and reception signals are about 5 milliseconds, respectively; the periods $T_1$ and $T_2$ in FIG. 2 would then be: $T_1 = 277$ milliseconds and $T_2 = 831$ milliseconds ($= T_1 \times 3$).

Description will now be made of a case where the master station equipment conducts the appliance control for a specified remote station equipment.

Figure 3:
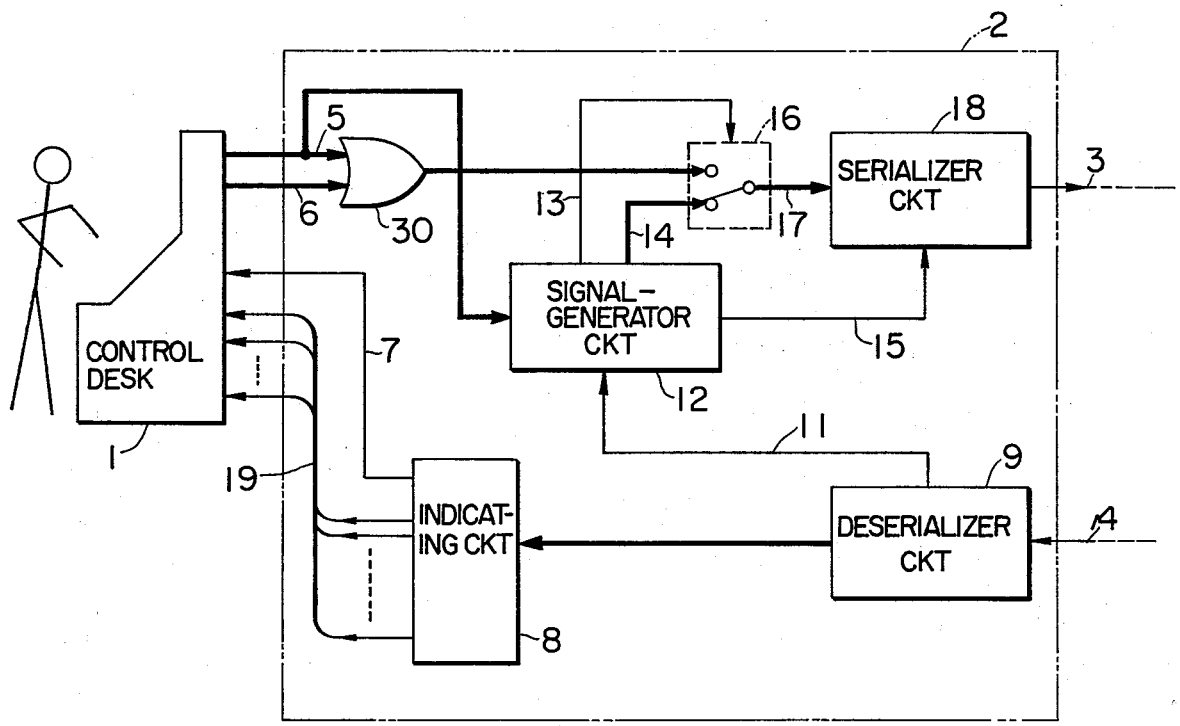
FIG. 3 is a block diagram of a logical circuit of a master station as is conventional in the 1-to-N type.

FIG. 3 is a detailed drawing of the master station side of FIG. 1, and shows especially the master station logical unit in detail. FIG. 4 is a time chart illustrative of an appliance control procedure corresponding to FIG. 3.

Referring to FIG. 3, in case of the usual remote station calling scanning (the usual indicating mode), a remote station calling signal 14 is provided from a remote station calling signal-generator circuit 12 via a transmission signal switching circuit 16 to a serializer circuit 18 as a parallel transmission signal 17. The transmission is initiated by a transmission initiation-command signal 15 from the remote station calling signal-generator circuit 12, and the serialized signal is transmitted to the remote station over the control signal transmission line 3.

The responsive indicating information signal from the remote station is sent through the indicating signal transmission line 4 to a deserializer circuit 9. A deserialized parallel reception signal 10 is stored in an individual appliance state indicating circuit 8, and is also indicated on the supervisory control desk 1 as an individual appliance state indicating signal 19. On the other hand, a reception completion timing signal 11 is sent from the deserializer circuit 9 to the remote station calling signal-generator circuit 12. Simultaneously therewith, the next remote station calling signal is produced by the generator circuit 12, and the transmission is initiated again.

In this manner, in the usual state indication supervision, the sequential scanning is cyclically repeated, and the indicating information signals of the individual remote stations are indicated on the control desk 1.

There will now be described a case where the master station performs the control of the state of the appliance of the remote station equipment.

By reason of preventing a misoperation by the operator, the two-action control system is generally adopted in which the appliance of the remote station is selected beforehand and the completion of the selection is confirmed by the supervisory control desk, whereupon the actual appliance control is executed.

When, in FIG. 3, the operator operates the corresponding selective switch of the supervisory control desk 1 (control mode), an appliance selecting signal 5 is provided. Thus, the remote station calling signal-generator circuit 12 is caused to stop the usual calling scanning, the transmission signal is switched by a transmission signal switching signal 13, and the selective signal 5 is transmitted through an OR gate 30 to the remote station instead of the remote station calling signal 14. The particular remote station having received the selective signal from the master station transmits a selection completion signal to the master station as a responsive information acknowledgement. In many cases, the selection completion signal is transmitted to the master station in the form of a part of the indicating information signal from the remote station to the master station. The selection completion signal, having been received in the master station, is fed via the individual appliance state indicating circuit 8 and through an appliance selection completion signal line 7 and is indicated on the supervisory control desk 1. The operator confirms the indication by visual inspection, and thereafter manually operates a control switch its "on" or "off" position. Thus, an appliance control signal 6 is provided, while both the selective signal and the control signal are transmitted through the OR gate 30 to the remote station, and the actual control of the appliance is carried out. A responsive action indication of the controlled appliance is transmitted to the master station as the indicating information signal, and is given on the supervisory control desk 1. The operator confirms upon the responsive action indication that the control has been certainly executed and restores the selective switch on the supervisory control desk. Here, the appliance selecting signal 5 disappears for the first time, and the remote station calling signal-generator circuit 12 initiates the usual remote station calling scanning. FIG. 4 shows the foregoing control procedure as a time chart. At a point A, the appliance selecting switch operation is made, whereby the indication by the usual remote station calling scanning is interrupted to initiate the transmission of the selective signal. Shown in FIG. 4 is a case where the appliance of the remote station S1 is selected. At a point B, the selection completion signal from the remote station is indicated on the supervisory control desk. After the operator confirms the indication, he operates the control switch at a point C. At a point D, the responsive action of the appliance is indicated. After the operator confirms the indication, he restores the selective switch at a point E. Then, the usual remote station calling scanning is initiated. It is to be noted in this system that the indication by the usual remote station calling scanning is interrupted from the point A at which time the operator issues the appliance selecting command, until the point E at which time the appliance selection is released.

A period of time $T_{35}$ in FIG. 4 need be at least 4–5 seconds because the operator carries out the two confirmations based on the visual inspection at the points B and D and the two operations of the switches at the points C and E. In the time chart of FIG. 2, the appliance state renewal period $T_2$ of each remote station in the master station is usually about 831 milliseconds in the example calculation previously stated. However, once the control of the remote station appliance has been initiated, then the appliance state indicating signal of any remote station other than the particular remote station to be controlled is not renewed for at least 4-5 seconds. Accordingly, even when trouble occurs in any appliance of the remote station, it is indicated in the master station 4-5 seconds later. In a case where the operator has forgotten to restore the selective switch, the calling of the other remote stations is not executed until the switch is restored. Consequently, the master station is held in the condition of blind running for the whole system, and there is the danger that trouble occuring in one remote station will extend to the others and lead to a serious trouble.

The outline of the 1-to-N type remote supervisory control system will have been understood from the above explanation. This invention provides a better control method in such 1-to-N type remote supervisory control system.

Hereunder, concrete embodiments of this invention will be described. FIG. 5 is a block diagram of a master station logical circuit for explaining an embodiment of this invention, while FIG. 6 is a time chart showing a procedure in the case of the appliance state control of a remote station. Referring to FIG. 5, numerals 20 to 23 designate AND gates. Numeral 24 denotes an interruption signal for interrupting the usual remote station calling scanning and for providing the remote station calling signal-generator circuit 12 with the command for transmitting the selective control signal for the remote station appliance control. Numeral 25 represents a buffer memory reset signal, and numeral 26 a buffer memory. Numeral 27 indicates a selective signal storage completion signal which is provided when the appliance selecting signal 5 from the supervisory control desk is stored in the buffer memory 26, while numeral 28 indicates a control signal storage completion signal. Shown at 29 is a transmission termination timing signal.

When the operator operates the appliance selecting switch (not shown) of the supervisory control desk 1, the appliance selecting signal 5 is stored into the buffer memory 26. Further, the stored appliance selecting signal 5' is indicated on the supervisory control desk 1 as the selective signal storage completion. After the confirmation of the storage completion by a visual inspection, the operator operates the control switch. The control signal 6 is stored in the buffer memory 26. When both the selective signal and the control signal are stored in the buffer memory 26, the respective storage completion signals 27 and 28 pass through the AND gate 23 to deliver the interruption signal 24 to the remote station calling signal-generator circuit 12 and to open the AND gate 20. Owing to the interruption signal 24, the remote station calling signal-generator circuit 12 suspends the usual remote station calling scanning to deliver the transmission signal switching signal 13 so as to switch the transmission signal from the usual remote station calling signal 14 to the appliance selecting signal and also to deliver the transmission initiation command signal to the serializer circuit 18 over the signal line 15 so as to transmit the appliance selecting signal for the remote station.

The particular remote station having received the selective signal transmits the appliance selection completion signal to the master station in the form of a part of the indicating signal information as a response thereto. Upon receiving the responsive signal, the master station provides the appliance selection completion signal 7 from the appliance state indicating circuit 8 and opens the AND gate 21. The control signal 6' for the remote station equipment is transmitted along with the selective signal to the remote station via the OR gate 30 and the transmission signal switching circuit 16. The remote station having received the control signal controls the state of the appliance, for example, from "off" to "on" in response thereto.

When the control is completed by the control signal of the appliance of the remote station, the remote station sends the state signal back to the master station equipment.

The reception termination timing signal 11 bestows the next starting of transmission on the remote station calling signal-generator circuit 12. The appliance selecting signal is transmitted via the AND gate 20, and the appliance control signal via the AND gate 21. Thus, the actual control of the appliance is executed in the remote station.

Further, at the time when the transmission of the appliance control signal has been terminated, the transmission termination timing signal 29 is delivered from the serializer circuit 18. Thus, the buffer memory reset signal 25 is fed from the AND gate 22 to the buffer memory 26, and all the appliance selecting signals 12 and the appliance control signals having which have been stored in the buffer memory 26 are reset.

The interruption signal 24 disappears due to the resetting. The remote station calling signal-generator circuit 12 initiates the usual remote station calling scanning again. The responsive action indication of the controlled appliance is transmitted from the remote station by the call signal of the particular remote station in the next cycle. The operator confirms the indication on the supervisory control desk of the master station. Then, the series of steps of the remote station appliance control procedure are terminated.

FIG. 6 shows a above procedure as the time chart. At a point A, the operator operates the appliance selecting switch of the supervisory control desk 1. The signal is stored into the buffer memory as the selective signal storage.

The stored information is indicated on the supervisory control desk 1 immediately at the point B. Thus, the operator confirms that the signal of the selective switch which he has operated is certainly stored into the buffer memory. Thereafter, he operates the control switch for the appliance at point C.

At the time when the control signal has been stored into the buffer memory, the master station logical circuit is endowed with the interruption signal for the request of the selective signal transmission. The usual remote station calling scanning is suspended, and the appliance selecting signal is transmitted to the remote station at a time A'. As a response thereto, the appliance selection completion signal is transmitted from the remote station to the master station under the state under which it is included in the indicating information signal. The appliance selection completion signal from the remote station is transmitted to the master station logical circuit at a point B'. Thus, as illustrated at a point C', both the appliance selecting signal and the appliance control signal are transmitted from the master station to the remote station. Then, the actual control of the appliance is executed in the remote station.

On the other hand, simultaneously with the termination of the transmission of the appliance control signal in the master station, the appliance selecting signal and the appliance control signal stored in the buffer memory are reset at a point D', to return the operation mode of the master station to the original remote station calling scanning again. The responsive action indication to the master station, from the remote station appliance having had the actual control executed is transmitted to the master station by the usual remote station calling scanning from the master station although the transmission differs depending also on a period of time required for the responsive action of the appliance. The figure illustrates a case where the responsive action indication is transmitted to the master station by the remote station calling scanning of the next cycle.

As apparent from the above description, the control procedure of the method of this invention as shown in FIG. 6 is advantageous over that of the prior-art method as shown in FIG. 4. More specifically, in the prior-art method in FIG. 4, the usual remote station calling scanning is suspended during the time interval $T_{35}$ in which the operator operates the selective switch of the supervisory control desk at the point A, the control of the remote station appliance is carried out, the responsive action indication is confirmed, and finally the selective switch is restored at the point E. In contrast, in the method according to this invention in FIG. 6, the contents of the operations by the operator are at once stored into the buffer memory and thereafter the appliance control of the remote station is executed by the processing of logic levels requiring no judgement operation by the operator, and hence, the interruption of the usual remote station calling scanning can be confined to the necessary minimum time interval $T_{45}$. The master station can therefore quickly detect an abnormal condition such as a trouble occurring in any other remote station and take an appropriate countermeasure.

Furthermore, the appliance selecting signal and the appliance control signal stored in the buffer memory are automatically reset with the termination of transmission, and the master station logical circuit falls into the operation mode of the usual remote station calling scanning. Therefore, the disadvantage of the prior-art method is eliminated, namely, when the operator has forgotten to restore the appliance selecting switch, the calling scanning of the other remote stations is suspended, so that when trouble or an accident arises with respect to an appliance in any other remote station, the master station cannot detect it. Thus, this invention can realize a fail safe remote supervisory control system.

Moreover, the method of this invention has the beneficial effect that the two-action control of the selecting operation and the subsequent controlling operation applies to the operator and the operator can conduct a confirmations in substantially the fixed time irrespective of the transmission signal speed and the number of remote stations.

Where it is made the operator's duty to carry out the selecting operation and subsequently the controlling operation, the interruption signal 24 need not be generated by the output of the logical product element 23 for the signals 27 and 28. That is, the signal 28 can also be used as the interruption signal 24 as it is. In this case, the AND element 23 is unnecessary. An embodiment in this case is shown in FIG. 7.

It is also possible to provide an interlock so that, where the operator has erroneously set the control signal prior to the remote station selecting signal, the control signal cannot be set in the buffer memory 26. This expedient may be constructed by additionally providing an AND element 43 as shown by way of example in FIG. 8.

It is sometimes desired to transmit the selective signal for the remote station equipment anew after the operator's confirmation of the fact that both the selective and control signals have been set in the buffer memory, without automatically shifting to the remote station selecting operation as soon as the selective signal and the control signal have been set in the buffer memory 26. In such case, as illustrated in FIG. 8, the signals 5' and 6' are sent back to the control desk and indicated thereon. After the operator confirms the indication, a signal 41 is generated by his manual operation. The output signal of the AND element 23 and the signal 41 are put into the interruption signal 24 through a logical product element 40.

In accordance with this invention, a more effective remote supervisory control can be conducted by adding a function to be stated hereunder. That is, a failure is detected on the basis of the fact that, where the transmission becomes impossible on account of the failure of the transmission line between the master station and the remote station, no sending-back signal from the remote station arrives even a certain fixed time later. The same information is retransmitted from the master station on the basis of the detection.

When a complicated information processing in the master station as attendant upon requests for the increase of the number of remote stations and the enhancement of the processing speed in the remote supervisory control system of this type is considered, the master station equipment will come to use a controlling digital electronic computer in the future. The control desk will come to employ a CRT (cathode ray tube) display device. Also in such cases, the two-action control of the 1-to-N type is essentially held, and this invention is applicable.

In the embodiments, description has been made of the method in which, by the two-action control, only the selective signal is transmitted to the remote station at first and then the selective signal and the operation control signal are transmitted to the remote station after the selection completion signal has been received from the remote station. However, there may well be adapted a method in which the selective signal is not transmitted in case of transmitting the operation control signal. This is based on such way of thinking that, since the specified remote station has been already selected by the first transmission of the selective signal, only the control signal of a concrete appliance suffices at the second transmission. Even in such case, the two-action control holds between the operator and the object appliance, and the beneficial results owing to the execution of the selection and control through the buffer memory are similarly achieved.

We claim:

1. In a remote supervisory control system comprising a control desk operated by an operator, a single master station which receives signals from the control desk and a plurality of remote stations whose states are supervised and controlled by the master station, in which the master station has a buffer memory device for storing a selection signal selecting at least one from among the plurality of remote stations and an operation control signal for the selected remote station which are given by the operator through the control desk, a control method comprising:

a first step of storing the selection signal originated by the operator in said buffer memory device, a second step of storing the operation control signal originated by the operator in said buffer memory device when it has been indicated on the control desk that the first step has been completed, the operation control signal corresponding to the predetermined remote station selected by the selection signal stored in said buffer memory device, a third step of transmitting the selection signal from the buffer memory device to the selected remote station when both the selection signal and operation control signal have been stored in the buffer memory device, a fourth step of transmitting a selection completion signal to the master station from the selected remote station, a fifth step of transmitting the operation control signal stored in the buffer memory device to the selected remote station when the selection completion signal from the selected remote station has been received by the master station.

2. The control method as in claim 1, further comprising:

a sixth step of transmitting a transmission completion signal from the selected remote station to the master station after the selected remote station has received the operation control signal, a seventh step of resetting the sections of the buffer memory device used to store the selection and operation signals when both the selection completion and transmission completion signals are simultaneously present.

3. The control method as in claim 1, wherein both the selection signal and operation control signals stored in the buffer memory device are transmitted to the selected remote station when an operation control initiating signal issued from a control desk occurs simultaneously with the pressure in the buffer memory device of both the selection signal and the operation control signal.

4. The control method as in claim 1, wherein the second step starts when the control desk indicates that the first step has been completed and an operation control signal has been subsequently issued from the control desk.

* * * * *